United States Patent
Tsuchida et al.

(10) Patent No.: US 11,920,967 B2
(45) Date of Patent: Mar. 5, 2024

(54) OPTICAL FLUID DETECTION SENSOR FOR DETECTING FLOW OF IMMISCIBLE SLUG FLOW IN A FLUID DETECTION DEVICE

(71) Applicant: KYOCERA Corporation, Kyoto (JP)

(72) Inventors: Katsumi Tsuchida, Aira (JP); Hiroyuki Okushiba, Uji (JP); Tetsuya Matsushita, Otsu (JP)

(73) Assignee: KYOCERA Corporation, Kyoto (JP)

( * ) Notice: Subject to any disclaimer, the term of this patent is extended or adjusted under 35 U.S.C. 154(b) by 420 days.

(21) Appl. No.: 17/293,992

(22) PCT Filed: Nov. 14, 2019

(86) PCT No.: PCT/JP2019/044707
§ 371 (c)(1),
(2) Date: May 14, 2021

(87) PCT Pub. No.: WO2020/105540
PCT Pub. Date: May 28, 2020

(65) Prior Publication Data
US 2022/0003585 A1    Jan. 6, 2022

(30) Foreign Application Priority Data
Nov. 19, 2018    (JP) ................... 2018-216092

(51) Int. Cl.
*G01F 1/7086*    (2022.01)
*G02B 5/30*    (2006.01)

(52) U.S. Cl.
CPC .............. *G01F 1/7086* (2013.01); *G02B 5/30* (2013.01)

(58) Field of Classification Search
None
See application file for complete search history.

(56) References Cited

U.S. PATENT DOCUMENTS

| | | |
|---|---|---|
| 2008/0195020 A1 | 8/2008 | Cabuz et al. |
| 2009/0097010 A1 | 4/2009 | Yamaguchi |
| 2011/0174081 A1 | 7/2011 | Furusato et al. |

(Continued)

FOREIGN PATENT DOCUMENTS

| | | |
|---|---|---|
| CN | 101349398 A | 1/2009 |
| CN | 101408622 A | 4/2009 |

(Continued)

*Primary Examiner* — Harshad R Patel
(74) *Attorney, Agent, or Firm* — Volpe Koenig (57) ABSTRACT

A fluid detection sensor includes: an optical sensor including a light emitting element array and a light receiving element array which are arranged on a substrate along a longitudinal direction thereof; a flow path member which includes a tubular body which is transparent and is arranged along the longitudinal direction facing the optical sensor, an inside of the tubular body constituting a flow path through which a plurality of substantially immiscible fluids flow as a slug flow; and a reflecting member placed on a side opposite to the optical sensor with respect to the flow path. The fluid detection sensor detects changes in light which occur in accordance with a movement of the plurality of fluids by the light receiving element array receiving light which is emitted by the light emitting element array toward the slug flow in the flow path and is reflected by the reflecting member.

12 Claims, 9 Drawing Sheets

(56) References Cited

U.S. PATENT DOCUMENTS

2017/0016753 A1 1/2017 Shi et al.
2021/0293746 A1* 9/2021 Yan .................. H01L 27/14632
2021/0356378 A1* 11/2021 Yoneta ............... G01N 15/1404

FOREIGN PATENT DOCUMENTS

| JP | 01-109218 A | 4/1989 |
|----|-------------|--------|
| JP | 05-119159 A | 5/1993 |
| JP | 2005-216730 A | 8/2005 |
| JP | 2010-071711 A | 4/2010 |
| JP | 2018-159671 A | 10/2018 |

* cited by examiner

OPTICAL FLUID DETECTION SENSOR FOR DETECTING FLOW OF IMMISCIBLE SLUG FLOW IN A FLUID DETECTION DEVICE

CROSS-REFERENCE TO RELATED APPLICATION

This application is a national stage entry according to 35 U.S.C. 371 of International Application No. PCT/JP2019/044707 filed on Nov. 14, 2019, which claims priority to Japanese Patent Application No. 2018-216092 filed on Nov. 19, 2018, the contents of which are entirely incorporated herein by reference.

TECHNICAL FIELD

The present disclosure relates to a fluid detection sensor and a fluid detection device suitable for detecting changes in movement speed and the like of a slug flow formed by flowing fluids which are substantially immiscible, through a thin tubular flow path.

BACKGROUND

A slug flow is a flow in a state in which fluids which are substantially immiscible with each other, such as a gas and a liquid, or an aqueous liquid and an oily liquid, alternately flow in a mass called a slug in a flow path formed by a tubular body such as a circular tube with an inner diameter of up to several mm. In the slug flow, fluids which do not dissolve in each other flow independently in the flow path, so that a circulating flow is generated in each slug. As a result, it is possible to achieve both high local mixing performance due to the circulating flow and gentle stirring conditions due to low shearing properties. In addition, the circulating flow of slug frequently updates concentration at an interface between gas and liquid or at an interface between liquid and liquid. Therefore, it has an effect of promoting mass transfer between fluid phases of each other and has an effect of improving reaction efficiency by promoting mass transfer. Therefore, the slug flow is expected to be applied to various fields such as various reactions as a microreactor, cleaning of pipes, stirring operation in the biotechnology field, and separation and recovery of rare metal.

Moreover, when applying a slug flow, it is important to detect the flow. Therefore, various configurations are proposed in which an optical sensor is used to detect a slug flow. For example, Japanese Unexamined Patent Publication JP-A 2005-216730 describes that, as fluid detecting means for detecting a liquid phase or a gas phase of meniscus in a slug flow of gas-liquid two-phase flow discharged from a direct methanol fuel cell, a transparent portion is provided in a part of an outflow path and paired optical sensors are arranged on an upstream side and a downstream side thereof. According to this, the liquid phase and the gas phase of the meniscus in the slug flow can be detected and the liquid and the gas on a discharge side of a fuel cell can be detected with a simple configuration.

Further, Japanese Unexamined Patent Publication JP-A 2010-71711 describes a flow sensor including a tubular member including a straight portion and a plurality of photosensors for detecting an interface between a first fluid and a second fluid moving in the straight portion to measure a movement speed of blood (first fluid) in a blood filter or introduction of air (second fluid) into blood. According to this, the movement speed of the interface can be detected by a plurality of photosensors and a change over time of the movement speed can be measured.

The fluid detecting means and the flow rate sensor described in those patent publications are intended to detect the interface of the fluid by using only a light receiving sensor, each specializing in a specific purpose. Therefore, for various slug flows formed by a combination of various fluids, a fluid detection sensor having favorable sensing performance suitable for detecting a movement speed, magnitude, and changes in a slug and a fluid detection device using the fluid detection sensor are desired.

SUMMARY

A fluid detection sensor of the disclosure includes an optical sensor including a light emitting element array including a plurality of light emitting elements and a light receiving element array including a plurality of light receiving elements, the light emitting element array and the light receiving element array being arranged on a substrate along a longitudinal direction of the substrate, a flow path member which includes a tubular body which is transparent and is arranged along the longitudinal direction facing the optical sensor, an inside of the tubular body constituting a flow path through which a plurality of fluids which are substantially immiscible flow as a slug flow, and a reflecting member placed on a side opposite to the optical sensor with respect to the flow path. The fluid detection sensor detects changes in light which occur in accordance with a movement of the plurality of fluids by the light receiving element array receiving light which is emitted by the light emitting element array toward the slug flow in the flow path and is reflected by the reflecting member.

A fluid detection device of the disclosure includes the fluid detection sensor described above and a processing unit configured to control light emission in the plurality of light emitting elements in the light emitting element array, detect changes in output current in the plurality of light receiving elements in the light receiving element array in response to changes in light which occur in accordance with a movement of the plurality of fluids, and acquire information on the slug flow from detected changes in output current.

BRIEF DESCRIPTION OF DRAWINGS

FIGS. 1A to 1C are views illustrating an example of an embodiment of a fluid detection sensor of the disclosure, where

FIGS. 9A and 9B are views illustrating another example of the embodiment of the fluid detection sensor of the disclosure, where

DETAILED DESCRIPTION

A fluid detection sensor of the disclosure detects changes of light which occur in accordance with a movement of a plurality of fluids by receiving light which is emitted by a light emitting element array toward a slug flow in a flow path and is reflected by a reflecting member, with a light receiving element array. This is suitable for detecting the movement speed, magnitude, and changes in the slug with respect to various slug flows and favorable sensing performance can be obtained.

A fluid detection device of the disclosure includes a fluid detection sensor of the disclosure and a processing unit configured to control light emission in a plurality of light emitting elements in a light emitting element array, detect changes in output current in a plurality of light receiving elements in a light receiving element array, and acquire information on a slug flow from the changes in output current. This is suitable for detecting the movement speed, magnitude, and change of the slug with respect to various slug flows and favorable sensing performance can be obtained.

Hereinafter, examples of embodiments of the fluid detection sensor and the fluid detection device of the disclosure will be described with reference to the drawings. The following examples exemplify the embodiments of the disclosure and the disclosure is not limited to these embodiments.

Figure 1A:
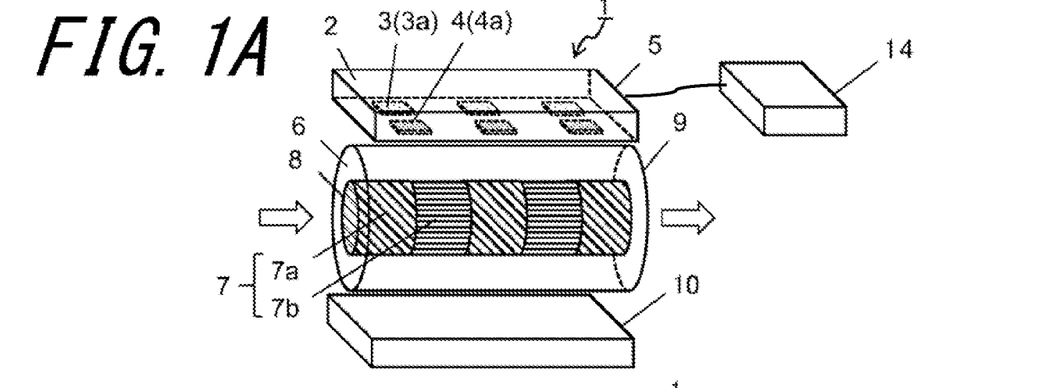
FIG. 1A is a partial transparent perspective view.
Figure 1B:
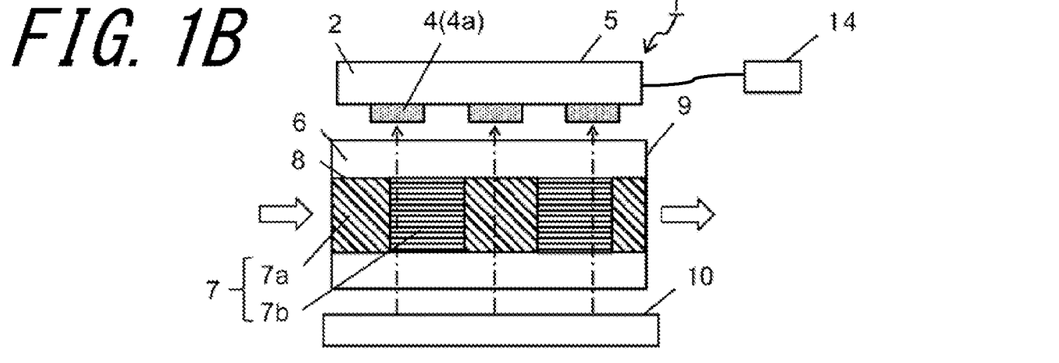
FIG. 1B is a side view along a longitudinal direction.
Figure 1C:
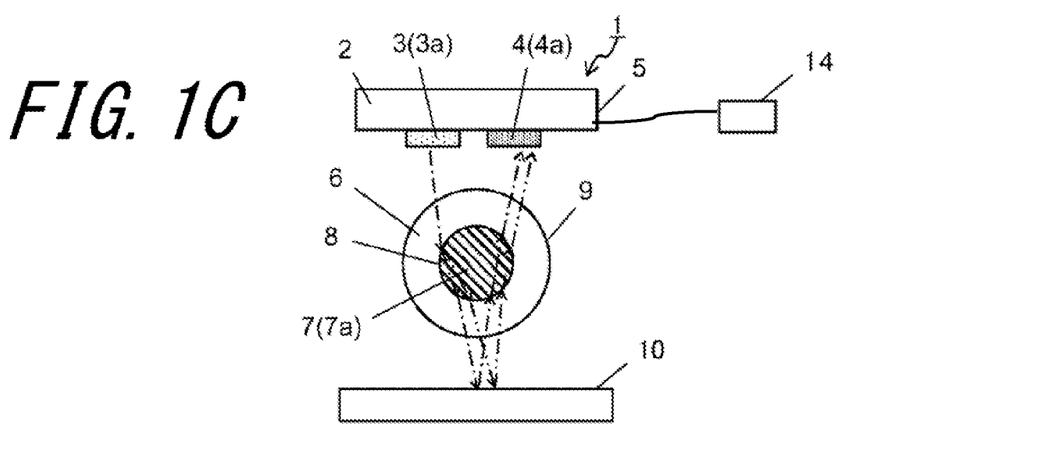
FIG. 1C is a cross-sectional view seen in a cross section orthogonal to the longitudinal direction.

FIG. 1A is a partial transparent perspective view illustrating an example of the embodiment of the fluid detection sensor of the disclosure. FIG. 1B is a side view of a flow path member along a longitudinal direction thereof. FIG. 1C is a cross-sectional view seen in a cross section orthogonal to the longitudinal direction of the flow path member. A fluid detection sensor 1 of the disclosure includes an optical sensor including a light emitting element array 3 including a plurality of light emitting elements 3a and a light receiving element array 4 including a plurality of light receiving elements 4a, the light emitting element array and the light receiving element array being arranged on a substrate 2 along a longitudinal direction of the substrate 2. Further, the fluid detection sensor 1 includes a flow path member 9 which includes a tubular body 6 which is transparent and is arranged along the longitudinal direction facing the optical sensor 5, an inside of the tubular body 6 constituting a flow path 8 through which a plurality of fluids 7 (7a, 7b) which are substantially immiscible flow as a slug flow. Further, the fluid detection sensor 1 includes a reflecting member 10 arranged on a side opposite to the optical sensor 5 with respect to the flow path 8.

In addition, in FIG. 1A, the light emitting element array 3 including the plurality of light emitting elements 3a and the light receiving element array 4 including the plurality of light receiving elements 4a, the light emitting element array 3 and the light receiving element array 4 being arranged on a lower surface of the substrate 2, are illustrated in a transparent state. In addition, the plurality of fluids 7a and 7b which form the slug flow and are substantially immiscible with each other, are illustrated by hatching each. White arrows illustrated on the left and right of the flow path 8 indicate a direction of the flow of the fluid 7, and in FIG. 1A, the fluid 7 flows from the left to the right in the drawing. Arrows of alternate long and short dash lines illustrated in FIGS. 1B and 1C virtually indicate a state where light emitted by the light emitting elements 3a, passing through the flow path member 9, and reflected by the reflection member 10 passes through the flow path member 9 again and go toward the light receiving elements 4a. These alternate long and short dash lines do not necessarily indicate optical paths accurately. Further, when refractive indexes of the fluids 7 (7a, 7b) passing through the flow path 8 are different, these optical paths will change according to the difference in the refractive indexes.

According to such a fluid detection sensor 1, the light emitting elements 3a of the light emitting element array 3 irradiate the slug flow flowing through the flow path 8 of the flow path member 9, and light reflected by the reflecting member 10 is received by the light receiving elements 4a of the light receiving element array 4, in such a manner that changes in the light which occur in accordance with the movement of the plurality of fluids (7a, 7b) is detected. Therefore, for various slug flows formed by various fluids 7 (7a, 7b), the movement speed, magnitude, and changes in the slug (each fluid 7 (7a, 7b)) can be optically detected.

Here, the changes in light which occur in accordance with the movement of the plurality of fluids 7 (7a, 7b) are due to the difference in various properties of the plurality of fluids (7a, 7b) which are substantially immiscible. Examples of such differences in characteristics include differences in refractive index, transparency, and color. Alternatively, the presence or absence of particles or the likes in the fluid 7, differences in size, amount, color tone, and the like, specifically, differences in light transmittance due to differences in suspensions or emulsions containing colloidal particles, or the like can be exemplified. Alternatively, the presence or absence or size of air bubbles in the fluid 7, the difference in light transmittance due to the difference in weight, and the like can be exemplified. As such a combination of the fluid 7, it can be applied to various combinations such as a combination of a gas and a liquid, or a combination of an aqueous liquid and an oily liquid as long as it is any combination that forms a slug flow within the flow path 8 without mixing with each other.

As a combination of the liquid-liquid fluids 7 (7a, 7b) forming a slug flow to which the fluid detection sensor 1 of the disclosure is suitably applicable, for example, as a reaction for extracting lithium from an aqueous alkali metal ion solution such as lithium (Li), a combination of water and cyclohexane can be exemplified.

In addition, for the purpose of performing organic synthesis using a slug flow, as an organic solvent, a solvent of aliphatic hydrocarbons such as hexane and heptanes, a solvent of aromatic hydrocarbons such as toluene, xylene, and ethylbenzene, a halogen-containing hydrocarbon solvent such as methylene chloride, chloroform, and carbon tetrachloride, and a solvent containing a heteroatom hydrocarbon such as N, N-dimethyl formaldehyde, sulfoxide, acetonitrile, or pyridine can be exemplified. By using these organic solvents in the first fluid 7a and using a liquid or gas for the second fluid 7b which is substantially immiscible with them, a slug flow is formed in the flow path 8 and various synthetic reactions and the like can be carried out.

In addition, as a combination of a gas-liquid fluid 7 (7a, 7b) forming a slug flow, for example, a combination of gaseous oxygen or air and liquid ethyl lactate as an oxidation reaction of ethyl lactate to obtain ethyl pyruvate as an application, a combination of gaseous carbon monoxide and liquid nitrobenzene in which a catalyst is dissolved as a reaction to obtain phenyl isocyanate by direct carbonylation of nitrobenzene, a combination of gaseous oxygen and liquid indane as a photooxidation reaction of indane to obtain 1-indanone, and the like are exemplified.

The flow path member 9 includes the transparent tubular body 6 and is arranged along the longitudinal direction of the substrate 2 so as to face each other along the alignment of the light emitting element array 3 and light receiving element array of the optical sensor 5. An inside of this tubular body 6 constitutes the flow path 8 in which the plurality of fluids 7 (7a, 7b) flow as a slug flow. The tubular body 6 is of appropriate size to secure the flow path 8 through which the slug flow flows. Usually, for example, one having an inner diameter (diameter of flow path 8) of about 0.5 mm to 2 mm and an outer diameter of about 1 mm to 4 mm is used. A length of the flow path member 9 is appropriately set according to the purpose of the slug flow, but the length required for the fluid detection sensor 1 of the disclosure may be about the same as the length of the optical sensor 5.

The tubular body 6 needs to be transparent in order to detect the slug flow using the optical sensor 5. Being transparent does not mean that it is completely clear and means that it has light transmission required to detect changes in light which occur in accordance with the movement of the fluid 7, by the optical sensor 5. Also, it may be so-called transparent or light-transmitting, which has favorable light transmission. Further, the tubular body 6 is a circular tube having a circular cross-sectional shape in this example, but is not limited to this, and may be a square tube having a cross-sectional shape such as a quadrangular shape, a triangular shape, or a hexagonal shape. The flow path member 9 may be configured by selecting the tubular body 6 having a shape and dimensions that can set an appropriate optical path for detection according to an optical combination with the fluid 7, the optical sensor 5, and the reflecting member 10.

As a material of the tubular body 6, for example, various glass, quartz, crystal, sapphire, or various resins such as polytetrafluoroethylene (PTFE), polyethylene, and polydimethylsiloxane (PDMS) can be used. The material of the tubular body 6 is selected in consideration of conditions for forming a slug flow such as affinity or resistance to the fluid 7. For example, in the case where the tubular body 6 made of a hydrophobic material such as PTFE is used, as the fluid 7, the aqueous phase becomes slug (droplets) and the oil phase becomes a dispersed phase to form a slug flow. On the other hand, in the case where the tubular body 6 made of a hydrophilic material such as glass is used, as the fluid 7, the aqueous phase becomes a dispersed phase and the oil phase becomes slug (droplets) to form a slug flow.

It is preferable that the refractive index of the tubular body 6 forming the flow path member 9 is different from the refractive index of at least one of the plurality of fluids 7 (7a, 7b). This makes it suitable for detecting changes in light caused by differences in refraction in accordance with the movement of the fluid 7. As for the degree of difference in the refractive index, in the case where it is intended to detect changes in light due to the difference in the refractive index, it is preferable that their values are different by at least about 0.05 or more, for example.

The combination of the tubular body 6 of the flow path member 9 and the fluid 7 and its refractive index are as follows. For example, in the case where PTFE with a refractive index of 1.35 is used for the tubular body 6, if water (refractive index 1.33) is used as the fluid 7a and cyclohexane (refractive index 1.426) is used as the fluid 7b to form a slug flow, the optical sensor 5 can satisfactorily detect changes in light which occur in accordance with the movement.

In addition, as the combination of the fluids 7, water is used as one fluids 7a and hexane (refractive index 1.372 to 1.3754) or kerosene (refractive index 1.44) is used as the fluid 7b for extraction, or toluene (refractive index 1.496) or p-xylene (refractive index 1.493 to 1.4958) is used as the fluid 7b as the solvent for the organic reaction, in such a manner that a favorable slug flow can be formed. As the above refractive index, nd25, which is the most widely used, may be used. The refractive index nd25 is a value of the refractive index measured using a sodium D-line as a light source in an environment of 25° C.

The optical sensor 5 has, for example, the light emitting element array 3 and the light receiving element array 4 in which the plurality of light emitting elements 3a and the plurality of light receiving elements 4a are arranged along the longitudinal direction on the substrate 2 with a rectangular shape. The light emitting elements 3a and the light receiving elements 4a may be directly formed on the substrate 2 as described below, or may have individual elements mounted on the substrate 2.

As the light emitting element 3a, a light source having excellent frequency responsiveness such as a light emitting diode (LED), a laser diode (semiconductor laser) (LD), or an EL (Electro Luminescence) element is used. It is preferable to use a light emitting diode for the light emitting element 3a of this example. Since the light emitting diode has a wide selection of emission wavelengths, excellent frequency response, and an appropriate spread of light emission, it is possible to irradiate the flow path 8 with light without extreme bias. Therefore, since the tolerance of the optical arrangement for detection is also good, it is easy to select a suitable light source for various fluids 7.

As the light receiving element 4a, an element such as a photodiode (PD), which has good matching with the light emission of the light emitting element 3a and has excellent frequency response, may be used.

The reflecting member 10 is located on a side opposite to the optical sensor 5 with respect to the flow path 8. The light emitted from the light emitting element 3a of the optical sensor 5 toward the slug flow of the flow path 8 passes through the flow path member 9 including the flow path 8, enters the reflecting member 10, is reflected on the surface of the reflecting member 10, and then passes through the flow path member 9 again, and is received by the light receiving element 4a of the optical sensor 5. By adjusting the distance from the flow path member 9, the positional relationship with the optical sensor 5 via the flow path member 9, the angle, and the like and appropriately setting the arrangement of the reflecting member 10, the optical path from the light emitting element 3a to the light receiving element 4a is adjusted, in such a manner that the changes in light in accordance with the movement of the slug flow in the flow path 8 can be detected well. In the reflection by the reflecting member 10, reflected light by specular reflection is used to secure a sufficient amount of light for optical detection. As the reflecting member 10, a member (mirror member) including a specularly reflecting surface like a normal mirror can be used. Further, depending on the conditions of the optical sensor 5 and the fluid 7 (7a, 7b), one having a dimming reflective surface that attenuates a predetermined amount of light may be used.

In the fluid detection sensor 1 of the disclosure as described above, various preferred forms can be considered.

For example, in the example illustrated in FIG. 1C, in the case of the light emitting element array 3 and light receiving element array 4 of the optical sensor 5 and the flow path 8 of the flow path member 9, a center position of flow path 8 is placed so as to overlap a center of the alignment of the light emitting element array 3 and the light receiving element array 4. On the other hand, the flow path member 9 may be arranged so that the center position of the flow path 8 is offset from the center of the alignment of the light emitting element array 3 and the light receiving element array 4 to the light receiving element array 4 side. Therefore, the flow path member 9 is irradiated by the light emitting element array 3, and the optical path is refracted by the tubular body 6 and the fluid 7 (7a, 7b), and further, the light is reflected by the reflecting member 10 and enters the flow path member 9 again, and then the optical path is refracted by the tubular body 6 and the fluid 7 (7a, 7b), and the state of refraction of the optical path changes. As a result, it becomes possible to receive light by the light receiving element array 4, which will be close to the flow path member 9. At this time, the amount of displacement may be appropriately set while checking the status of light reception by the light receiving element array 4 within the range where the central position of the flow path 8 is not beyond the position of the light receiving element array 4.

Figure 8:
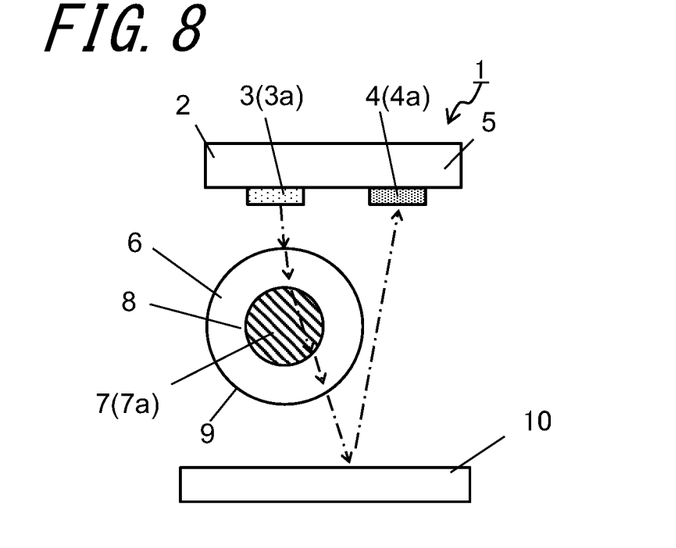
FIG. 8 is a cross-sectional view similar to FIG. 1C illustrating another example of the embodiment of the fluid detection sensor of the disclosure.

In the case where the reflecting member 10 is a mirror member, for example, as illustrated in FIG. 8 in the same cross-sectional view as in FIG. 1C, the flow path member 9 may be arranged so that the center position of the flow path 8 is offset from the center of the alignment of the light emitting element array 3 and the light receiving element array 4 to the light emitting element array 3 side. In this case, the light which is emitted from the light emitting element array 3 to the flow path member 9 and of which the optical paths are refracted by the tubular body 6 and the fluid 7 (7a, 7b), and then which is incident on the reflecting member 10 and reflected can be directly incident on and received by the light receiving element array 4. In this way, the light reflected by the reflecting member 10 does not necessarily have to enter the flow path member 9 again and the light changed by the movement of the fluids (7a, 7b) before being incident on the reflecting member 10 may be reflected by the reflecting member 10 and directly incident on the light receiving element array 4. This tends to facilitate the adjustment of the optical path with respect to the optical sensor 5.

In the case where a mirror member is used for the reflecting member 10 as in the example described above, in order for the optical sensor 5 to stably detect changes in light which occur in accordance with the movement of the fluid 7, it is necessary to keep in mind that the arrangement of each member is accurately aligned and adjusted. For example, in the case of an arrangement tolerance between the flow path member 9 and the reflecting member 10, which is a mirror member, it is assumed that the size of the light receiving portion of the light receiving element 4a is 200 μm square, the beam diameter of the light emitted by the light emitting element 3a is 100 pmt, and the allowable value of the deviation of the beam incident on the light receiving element 4a is 50 μm. In this case, as the condition that the beam is not shifted when the optical sensor 5 is placed 15 mm away from the reflecting member 10, it may be necessary to adjust a tilt angle of the reflecting member 10 to within 0.1° (allowable tolerance of ±0.1°).

Figure 2A:
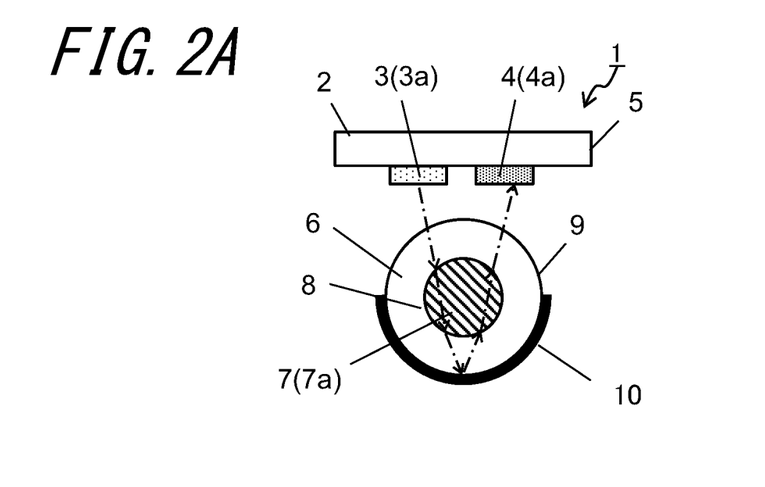
FIGS. 2A and 2B are cross-sectional views similar to FIG. 1C, respectively, illustrating another example of the embodiment of the fluid detection sensor of the disclosure.

In the example illustrated in FIG. 1, the reflecting member 10 is placed on a side opposite to the optical sensor 5 with respect to the flow path member 9, away from the flow path member 9, but it may be integrally placed on the flow path member 9. For example, as illustrated in FIG. 2A in the same cross-sectional view as in FIG. 1C, the reflecting member 10 is preferably arranged on an outer surface of the tubular body 6 of the flow path member 9. As a result, the fluid detection sensor 1 can be miniaturized and the influence of surface reflection on the outer surface of the tubular body 6 of the flow path member can be reduced, and thus it becomes possible to secure a sufficient amount of light received by the light receiving element array 4 and improve the signal intensity.

Figure 2B:
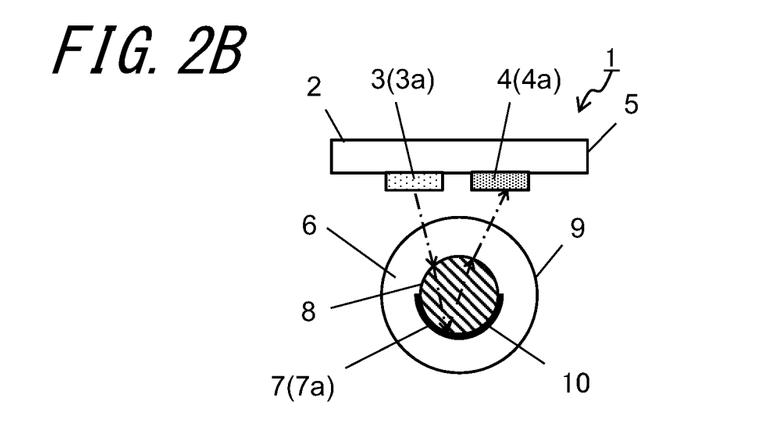

Further, for example, as illustrated in FIG. 2B in the same cross-sectional view as in FIG. 2A, the reflecting member is preferably arranged on an inner surface of the tubular body 6 of the flow path member 9. This also makes it possible to reduce the size of the fluid detection sensor 1 and reduce the influence of surface reflection on the outer surface of the tubular body 6. Further, by eliminating the optical path passing under the tubular body 6 of the flow path member 9, it becomes possible to further secure a sufficient amount of light received by the light receiving element array 4 and improve the signal intensity.

Figure 3:
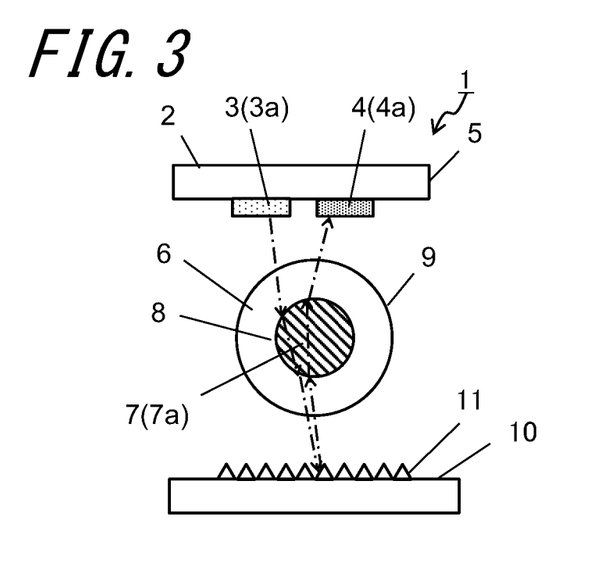
FIG. 3 is a cross-sectional view similar to FIG. 1C illustrating another example of the embodiment of the fluid detection sensor of the disclosure.

The reflecting member 10 preferably includes a retroreflective reflective surface, as illustrated in FIG. 3 in the same cross-sectional view as in FIG. 1C, in addition to the one having a normal reflective surface. In the example illustrated in FIG. 3, the reflecting member 10 includes a prism sheet 11 as a retroreflective reflecting surface. As a result, in retroreflection, the incident light is reflected so as to almost return in that direction, and thus it is possible to restrain the light that passes through the flow path member 9 and is incident on the reflecting member 10 from being reflected in a direction other than the flow path member 9. Therefore, most of the light incident on the reflecting member 10 can be returned to the flow path member 9 and the light which passes through the flow path member 9 can be received by the light receiving element array 4 again with a sufficient amount of light. There are two types of prism sheets 11: a triangular shape and a combination (full cube or corner cube) of square shapes. Also, there are a soft prism type which uses an aluminum film sheet or the like for the reflective film, a hard prism type which uses a resin plate or the like for the reflective film, and a metal vapor deposition prism type in which metal is vapor-deposited directly on the reflective film. Further, there is a high-luminance type in which each prism is coated with a transparent plastic film with an air layer interposed between them. It may be selected from these according to desired reflection characteristics and used as the prism sheet 11.

As the prism sheet 11, for example, in the case where a spot diameter of the incident light is about 200 μm, it is preferable to use a prism sheet in which about 3 to 30 prisms are included in the spot diameter with using a prism (or cube) having an apex angle (or internal angle) of about 60° and a side of about 50 μm.

The reflecting member 10 having such a retroreflective reflective surface is placed away from the flow path member 9 and the light incident and reflected directions of the reflecting member 10 are adjusted in the position, the angle, and the like so that the light receiving element array 4 can receive a sufficient amount of light, depending on the positional relationship with the optical sensor 5 and the flow path member 9.

As the retroreflective reflecting member 10, in addition to using a prism type prism sheet 11, those using glass beads can also be used. For example, a reflecting member called an exposed lens type or an open type with a large number (about 5000 to 8000 in 1 $cm^2$) of round spheres of high-refractive glass beads (about 30 μm to 100 μm in diameter) attached to a reflective film, a reflecting member called an enclosed lens type in which a large number of glass beads are attached to a reflective film and resin is coated, or a reflecting member called a capsule lens type or a reflective capsule type in which a large number of glass beads are mounted on a reflective film in a similar way and an air layer is interposed between them and coated with a transparent plastic film, or the like can be used.

Further, the above-described prism sheet 11 has no particular anisotropy in the angle of the light incident on the sheet and retroreflected and basically corresponds to the retroreflection in a wide range direction. In addition to this, for example, an optical sheet having anisotropy in the direction of retroreflection may be used, in which prism rows having substantially triangular, substantially trapezoidal, and substantially elliptical cross-sectional shapes are arranged in a row on the surface of the sheet base material. As such an optical sheet, for example, a sheet having an apex angle of about 60° to 90° and a period of about 30 μm to 100 μm of prism rows is used. Such a prism sheet 11 has a function of condensing incident light to the front by retroreflection and retroreflects the incident light in a direction generally orthogonal to a longitudinal direction of the prism row. Therefore, by adjusting the orientation of the prism rows with respect to the orientation of the flow path 8, it is possible to contribute to the setting of a favorable optical path for detection by the optical sensor 5.

In the retroreflection by the prism sheet 11, strictly speaking, the light is not always reflected in an incident direction accurately and a slight deviation of the optical path occurs during the reflection. However, the flow path member 9 is placed between the optical sensor 5 and the reflecting member 10, and the light travels through a medium having a curved surface as an interface and a different refractive index, and thus the change in the optical path due to the difference in the refractive index becomes remarkable and optical detection can be effectively performed. As a result, favorable sensing performance can be obtained.

In the case where the prism sheet 11 having such a prism row is used in the fluid detection sensor 1 of the disclosure, as in the example illustrated in FIG. 3, basically, in a state where the cross-section of the prism row is shown as in FIG. 3, the longitudinal direction of the prism row may be arranged parallel to the longitudinal direction of the flow path 8 or the direction of the arrangement of the light emitting element array 3 and the light receiving element array 4 in the optical sensor 5. In addition, when the light emitting element 3a of the light emitting element array 3 and the light receiving element 4a of the light receiving element array 4 form a plurality of pairs as described below and the arrangement of the paired elements is diagonal to the flow path 8, or the optical path is oblique to the longitudinal direction of the flow path 8 by making the optical path pass through the flow path member 9 even when the arrangement is orthogonal to the flow path 8, the longitudinal direction of the prism rows may be arranged at an angle of up to about 60° with respect to the longitudinal direction of the flow path 8 or the alignment direction of the light emitting element array 3 and the light receiving element array 4 in the optical sensor 5. Further, in relation to the adjustment of the optical detection by the light receiving element 4a in the fluid detection sensor 1, the longitudinal direction of the prism row may be arranged so as to be orthogonal to the longitudinal direction of the flow path 8.

In the case where a retroreflective reflecting member 10 with these prism sheets 11 placed is used, it is preferable to use a light emitting diode for the light emitting element 3a from the viewpoint that the light used for detecting the slug flow has appropriate directivity and spread.

Figure 9A:
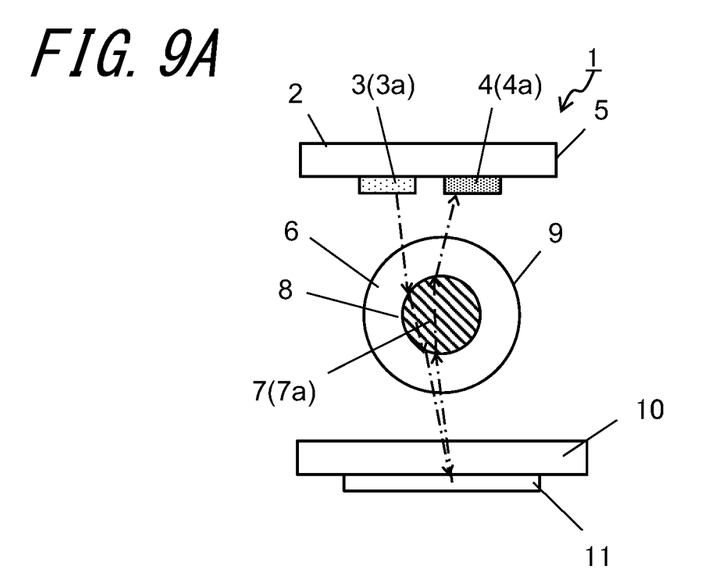
FIG. 9A is a cross-sectional view similar to FIG. 3
Figure 9B:
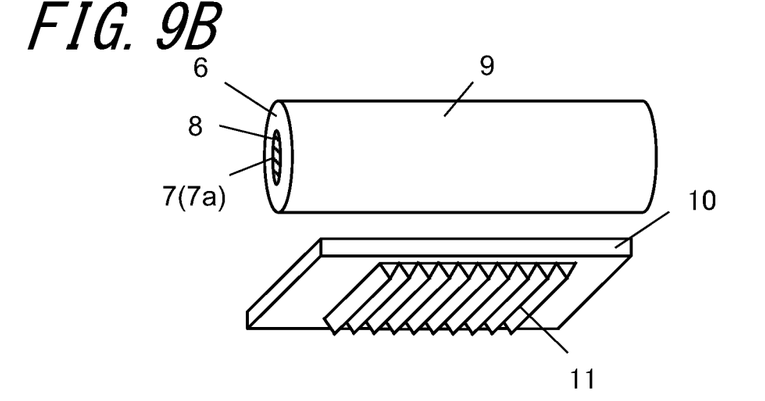
FIG. 9B is a perspective view of a part thereof looking up from a lateral side.

In the case where the prism sheet 11 including prism rows is used and the reflecting member 10 is made of transparent resin or the like, as in the example illustrated in FIG. 9, the prism sheet 11 may be placed on an opposite side (lower side in the drawing) of the flow path member 9 in the reflecting member 10. FIG. 9A is a cross-sectional view similar to that of FIG. 3, and FIG. 9B is a perspective view illustrating the relationship between the flow path member 9 and the reflecting member 10, which are a part of them, as viewed from the side. As shown in these drawings, in the reflecting member 10, the prism sheet 11 may be placed on the opposite side (lower side in the drawing) of the flow path member 9 so as to be reversed with respect to the example illustrated in FIG. 3. In this case, it is further preferable that the prism rows in prism sheet 11 are rotated by 90° in a plane and arranged so as to be orthogonal to the longitudinal direction of flow path 8. Even with such a retroreflective reflecting member 10, most of the light incident on the reflecting member 10 can be returned to the flow path member 9, and thus the light that passes through the flow path member 9 can be received by the light receiving element array 4 with a sufficient amount of light. Also, in this case, when the sheet-shaped reflecting member 10 is installed with respect to the tubular flow path member 9, the robustness regarding the parallelism with each other is improved and the tolerance for the arrangement tolerance is improved. For example, when the retroreflection structure of the prism sheet 11 in the reflecting member 10 is 45° and a beam deflection width of light incident on the reflecting member 10 from the light emitting element 3a through the flow path member 9 is 5°, as a condition that the beam is not shifted, a tilt angle θ of the reflecting member 10 can be allowed to be within 40° (allowable tolerance of ±40°).

Figure 10:
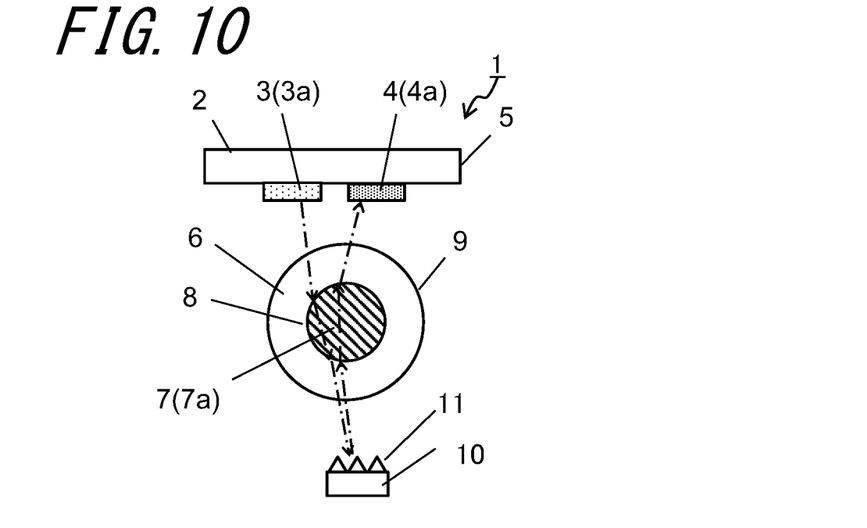
FIG. 10 is a cross-sectional view similar to FIG. 3 illustrating another example of the embodiment of the fluid detection sensor of the disclosure.

Further, when the retroreflective reflecting member 10 in which the prism sheet 11 is arranged is used, the size of the reflecting member 10 can be reduced, for example, as illustrated in the cross-sectional view of FIG. 10 similar to that in FIG. 3. By reducing the size of the reflecting member 10 which performs retroreflection in this way, for the optical path shift caused by the change in the refractive index due to the movement of the fluid 7 (7a, 7b) in the flow path member 9, in addition to the change in return light from reflecting member 10 to the light receiving element array 4, the beam of the light incident on the reflecting member 10 from the flow path member 9 can be made to deviate from the reflecting member 10 due to the deviation of the optical path. Therefore, it is possible to obtain the effect of highlighting the change in intensity (signal difference) of the light received by the light receiving element array 4 according to the change in the refractive index due to the movement of the fluid 7 (7a, 7b). This effect becomes remarkable when the size of the reflecting member 10 is made equal to the size of the light receiving portion of the light receiving element 4a. Therefore, when the arrangement tolerance of each member can be set small, it is effective for improving the sensing performance.

Figure 11:
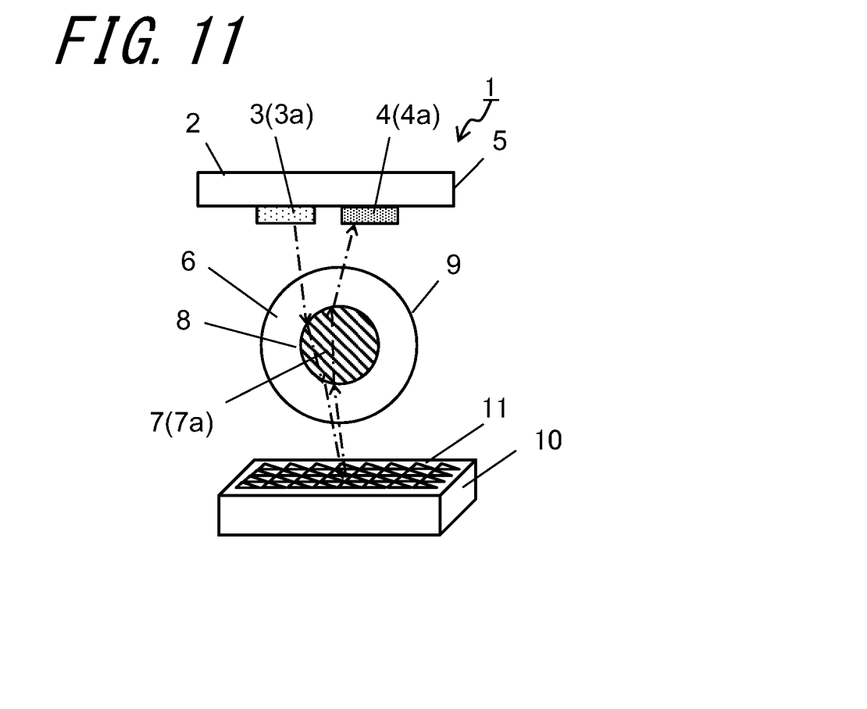
FIG. 11 is a cross-sectional view similar to FIG. 3, which is a partially perspective view illustrating another example of the embodiment of the fluid detection sensor of the disclosure.

As the retroreflective reflecting member 10, various types can be used as described above. An example is illustrated in FIG. 11. FIG. 11 is a cross-sectional view similar to that of FIG. 3, and the reflecting member 10, which is a part of them, is illustrated as a perspective view seen from diagonally above. In the example illustrated in FIG. 11, a three-sided type retroreflective sheet is used as the prism sheet 11 which is a retroreflective sheet in reflecting member 10. When such a retroreflective sheet is used, similarly, favorable sensing performance can be obtained, and when the sheet-shaped reflecting member 10 is installed, the tolerance of the arrangement tolerance with respect to the in-plane rotation can be increased to improve the robustness. As the prism sheet 11 which is such a three-sided retroreflective sheet, for example, the model number IRAVK700 of the trade name Albeedo (registered trademark) of Dexerials Corporation can be used.

Figure 4A:
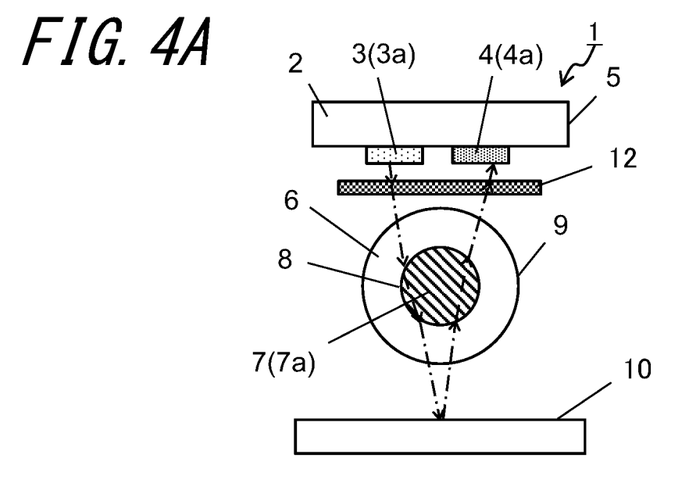
FIGS. 4A and 4B are cross-sectional views similar to FIG. 1C, respectively illustrating another example of the embodiment of the fluid detection sensor of the disclosure.

In the fluid detection sensor 1 of the disclosure, as illustrated in the cross-sectional view of FIG. 4A similar to that in FIG. 1C, it is preferable to provide a polarizing filter 12 arranged between the light emitting element array 3 and the light receiving element array 4, and the flow path member 9. As a result, vibration directions of the light incident on the flow path member 9 from the light emitting element array 3 (light emitting element 3a) and the light which passes through the flow path member 9 and is received by the light receiving element array 4 (light receiving element 4a) can be set to one desired direction. Therefore, although the amount of light that can be received by the light receiving element array 4 (light receiving element 4a) decreases, it is possible to reduce the influence of light that is reflected and scattered by each part of the flow path member 9 and becomes noise when detecting a slug flow, or stray light or disturbance light from the outside.

As such a polarizing filter 12, a polarizing film such as a dye-based polarizing film, an iodine-based polarizing film or a bicolor dye film, or a polarization filter in which those polarizing films are interposed between optical glasses can be used. The polarization direction may be appropriately set by adjusting the arrangement of the polarizing filter 12 while checking the reduction status of the influence of noise light, stray light, or disturbance light.

Figure 4B:
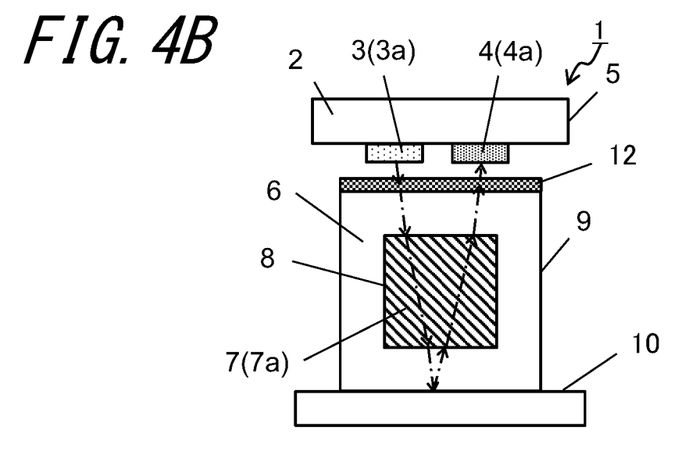

Further, as illustrated in the similar cross-sectional view in FIG. 4B, the polarizing filter 12 placed between the light emitting element array 3 and the light receiving element array 4, and the flow path member 9 may be placed on an upper surface of the flow path member 9 using a square tube having a rectangular cross section as the tubular body 6. As a result, it is possible to reduce the size of the fluid detection sensor 1 while achieving the effect of considering the polarizing filter 12. Further, in this case, the reflecting member 10 may be arranged on a lower surface of the flow path member 9, which makes it possible to reduce the size of the fluid detection sensor 1 while ensuring the function of the reflecting member 10.

Figure 5:
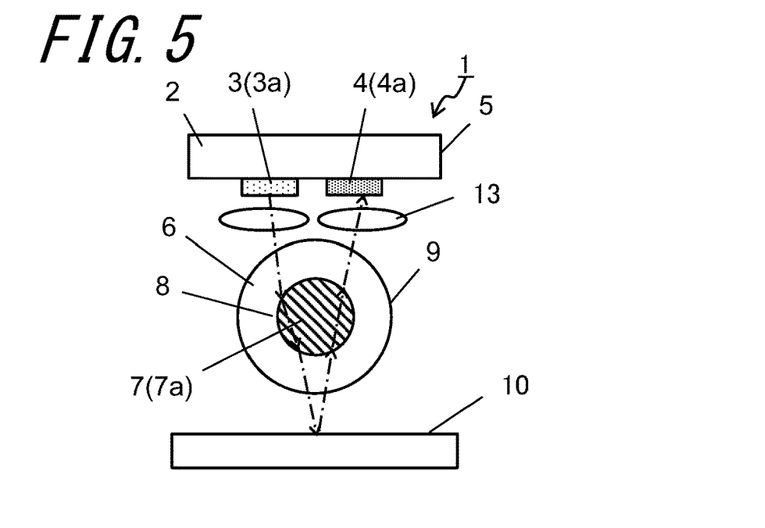
FIG. 5 is a cross-sectional view similar to FIG. 1C illustrating another example of the embodiment of the fluid detection sensor of the disclosure.

In the fluid detection sensor 1 of the disclosure, as illustrated in the cross-sectional view of FIG. 5 as similar to that of FIG. 1C, it is preferable to include lenses 13 arranged between the light emitting element array 3 and the light receiving element array 4, and the flow path member 9. According to this, by focusing the light emitted from the light emitting element array 3 (light emitting element 3a) to the flow path member 9 and the light passing through the flow path member 9 and received by the light receiving element array 4 (light receiving element 4a) with the lenses 13, the amount of light which can be used to detect the slug flow can be increased, and thus the detection sensitivity can be improved. As illustrated in FIG. 5 and as illustrated in the plan view of the optical sensor 5 in FIG. 6B, it is preferable that such lenses 13 are individually arranged so as to correspond to each of the light emitting element 3a of the light emitting element array 3 and the light receiving element 4a of the light receiving element array 4. As a result, the light condensing state can be adjusted individually according to each element, and the effect of the lens 13 can be satisfactorily achieved. Such a plurality of lenses 13 may be individually manufactured and arranged at a desired position with a lens holder (not illustrated). Further, for example, a lens portion corresponding to each of the light emitting element 3a and the light receiving element 4a is formed in one transparent substrate which covers the entire light emitting element array 3 and the light receiving element array 4, in such a manner that the plurality of lenses 13 may be arranged as a lens member integrally configured.

The lens 13 of this example illustrates a biconvex lens in which both surfaces are convex, but the lens 13 is not limited to this. For example, a plano-convex lens in which one main surface is convex and the other surface is flat may be used. As a material for the lens 13, for example, thermosetting resins such as silicone, urethane or epoxy, plastics such as thermoplastics resin such as polycarbonate and acrylic, transparent inorganic materials such as quartz, crystal, and sapphire, and inorganic glass such as optical glass can be exemplified.

Further, the lens 13 of this example is arranged in a direction parallel to the surface of the substrate 2 of the optical sensor 5. However, the lens 13 may be tilted with respect to the surface of the substrate 2 for the purpose of adjusting the optical path.

Figure 6A:
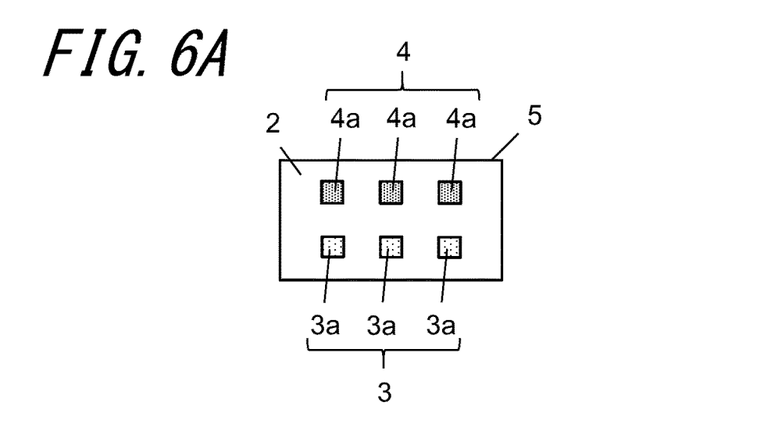
FIGS. 6A and 6B are plan views illustrating an example of an embodiment of an optical sensor in the fluid detection sensor of the disclosure.
Figure 6B:
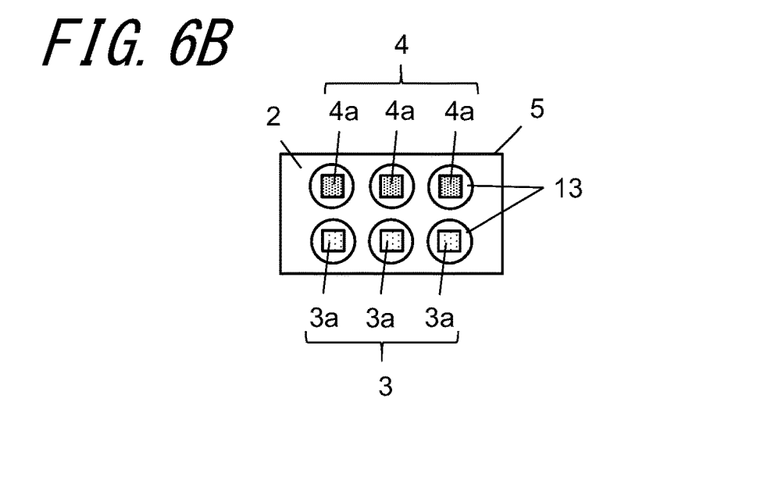

In the optical sensor 5 in the fluid detection sensor 1 of the disclosure, as illustrated in FIG. 1A and as illustrated in the plan view of the optical sensor in FIGS. 6A and 6B, it is preferable that the plurality of light emitting elements 3a of the light emitting element array 3 and the plurality of the light receiving elements 4a of the light receiving element array 4 form a plurality of pairs. Further, it is preferable that the light emitting element 3a and the light receiving element 4a forming a plurality of pairs are arranged on one substrate 2. As a result, the changes in light due to the flow of the fluid 7 (7a, 7b) in the slug flow can be detected as a change over time along a flow direction of the flow path 8 while reducing the size of the optical sensor 5. In addition, the positional relationship between the light emitting element 3a, which is a light source, and the light receiving element 4a, which is a light receiving portion, becomes constant and adjustments for each measurement are not required. As a result, it is possible to detect the slug flow by stable measurement.

In the case where the light emitting elements 3a and the light receiving elements 4a form a plurality of pairs, as illustrated in FIGS. 1A, 6A, and 6B, it is preferable that the number of the light emitting elements 3a of the light emitting element array 3 and the number of the light receiving elements 4a of the light receiving element array 4 are three or more, respectively, and the number of pairs of the light emitting element 3a and the light receiving element 4a is three or more. This is because, in the case where measurements for the detection of the slug flow by the plurality of pairs of the light emitting elements 3a and the light receiving elements 4a are made, when the measurement data is analyzed, if there are only two pairs, there is a risk of false detection in grasping the plurality of fluids 7 (7a, 7b) forming the slug flow. On the other hand, in the case where three or more pairs of the light emitting elements 3a and the light receiving elements 4a are provided, each of the plurality of fluids 7 (7a, 7b) flowing along the flow path 8 can be detected and grasped, the detection accuracy can be improved. Also, by continuously processing the measurement data obtained by the three or more pairs of the light emitting element 3a and the light receiving elements 4a, it becomes possible to detect the movement of the slug flow by detecting changes in light which occur in accordance with the movement of the plurality of fluids 7 (7a, 7b), with a measurement result as if it were recognized by an image.

To detect changes in light due to the movement of the plurality of fluids 7 (7a, 7b) by a plurality of pairs of the light emitting elements 3a and the light receiving elements 4a in this way, the emission time and interval of each light emitting element 3a and the difference in emission time between each pair are adjusted according to the size and movement speed of each fluid 7 (7a, 7b) forming the slug flow. For example, when each light emitting element 3a is arranged at intervals of 0.5 mm in the longitudinal direction of the substrate 2, if the light emission time of each light emitting element 3a is set to, for example, 1 msec to 10 msec, the light emission interval is also set to, for example, 1 msec to 10 msec, and the light emission time difference between each pair is set to, for example, 2 msec, a slug flow with a slug length of about 1 mm to 2 mm and a movement speed of about 750 mm/sec can be detected.

The number of pairs of the light emitting elements 3a and the light receiving elements 4a forming a plurality of pairs may be set according to the characteristics of the slug flow to be detected. However, when the upper limit is about ten pairs, preferably seven pairs or eight pairs, it can be said that the number of pairs is appropriate in consideration of the limit of the movement speed of the slug flow. For pairs that exceed the above number, the slug flow can be detected by processing the detected signal, but the same fluid 7 (7a, 7b) in the slug flow is only repeatedly detected. As a result, it can be said that it is unnecessary.

Figure 7:
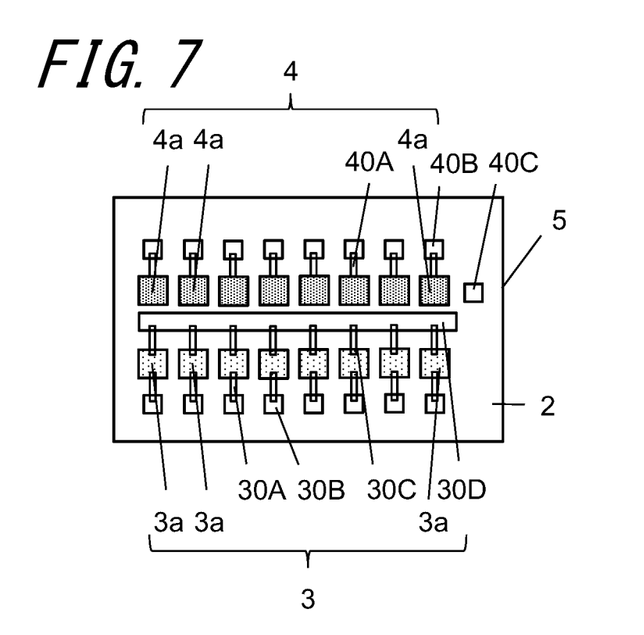
FIG. 7 is a plan view illustrating another example of the embodiment of the optical sensor in the fluid detection sensor of the disclosure.

Here, an example of an optical sensor having the light emitting element array 3 and the light receiving element array 4 including eight pairs of the light emitting elements 3a and the light receiving elements 4a is illustrated in a plan view in FIG. 7. The optical sensor 5 illustrated in FIG. 7 includes the substrate 2, eight light emitting elements 3a arranged in a row along the longitudinal direction on an upper surface of the substrate 2, and eight light receiving elements 4a arranged in a row along the longitudinal direction corresponding to each of the light emitting elements 3a on the upper surface of the substrate 2. The substrate 2 and each of the plurality of light emitting elements 3a are integrally formed. Similarly, the substrate 2 and the light receiving element 4a are integrally formed. That is, eight light emitting elements 3a and eight light receiving elements 4a are built on the same substrate 2 and are integrally formed. The optical sensor 5 of this example is used with the upper surface of the substrate 2 facing the flow path member 9.

In the optical sensor 5 of this example, one conductive type (for example, n type) semiconductor material such as silicon (Si) is used as the substrate 2 and the light emitting element 3a is a light emitting diode including a plurality of semiconductor layers laminated on its upper surface. Further, a pn junction is formed between a reverse conductive type (for example, p-type) semiconductor region formed in a part of the upper surface of the substrate 2 and the one conductive type region of the substrate 2 adjacent thereto, in such a manner that the light receiving element 4a forms a photodiode. With this configuration, the substrate 2, the light emitting element 3a, and the light receiving element 4a can be integrally built on the same substrate.

As described above, the plurality of light emitting elements 3a function as light sources for irradiating the plurality of fluids 7 (7a, 7b) flowing as a slug flow in the flow path 8. Further, the light emitted by the light emitting element 3a passes through the flow path member 9, is reflected by the reflecting member 10, passes through the flow path member again, and is received by being incident on a plurality of corresponding light receiving elements 4a. The light receiving element 4a functions as a photodetector which detects changes in light which occur in accordance with the movement of the plurality of fluids 7 (7a, 7b).

In FIG. 7, reference sign 30A denotes a light emitting element-side first electrode, reference sign 30B denotes a light emitting element-side first electrode pad, reference sign 30C denotes a light emitting element-side second electrode, and reference sign 30D denotes a light emitting element-side second electrode pad. Each of the plurality of light emitting elements 3a emits light and functions as a light source by applying a bias between the corresponding light emitting element-side first electrode pad 30B and the light emitting element-side second electrode pad 30D. Although not illustrated, the light emitting element-side first electrode pad 30B and an external power supply are connected by wire bonding using a gold (Au) wire or the like. Also, reference sign 40A denotes a second light receiving element-side first electrode, reference sign 40B denotes a second light receiving element-side first electrode pad, and reference sign 40C denotes a second light receiving element-side second electrode pad connected to the substrate 2. The plurality of light receiving elements 4a output an output current between the corresponding second light receiving element-side first electrode pad 40B and the second light receiving element-side second electrode pad 40C according to the received light.

In the case where a slug flow is detected with three to eight pairs of light emitting elements 3a and light receiving elements 4a, if the sizes of the plurality of fluids 7 (7a, 7b) forming a slug flow become smaller or the movement speeds of the plurality of fluids 7 (7a, 7b) fluctuate to become faster, it is possible to secure the detection accuracy by shortening the light emitting time and the light emitting interval of the light emitting element 3a and the light emitting time difference between each pair and shortening a sampling period. Also, when the sizes of the plurality of fluids 7 (7a, 7b) become larger or the movement speeds of the plurality of fluids 7 (7a, 7b) fluctuate to become slower, by adjusting the emission time, emission interval, and emission time difference in reverse with respect to the case described above, or by increasing the number of pairs of light emitting elements 3a and light receiving elements 4a, it is possible to ensure the accuracy of detection. Adjustment of such detection conditions is carried out so as to find appropriate conditions while performing actual detection.

Figure 12:
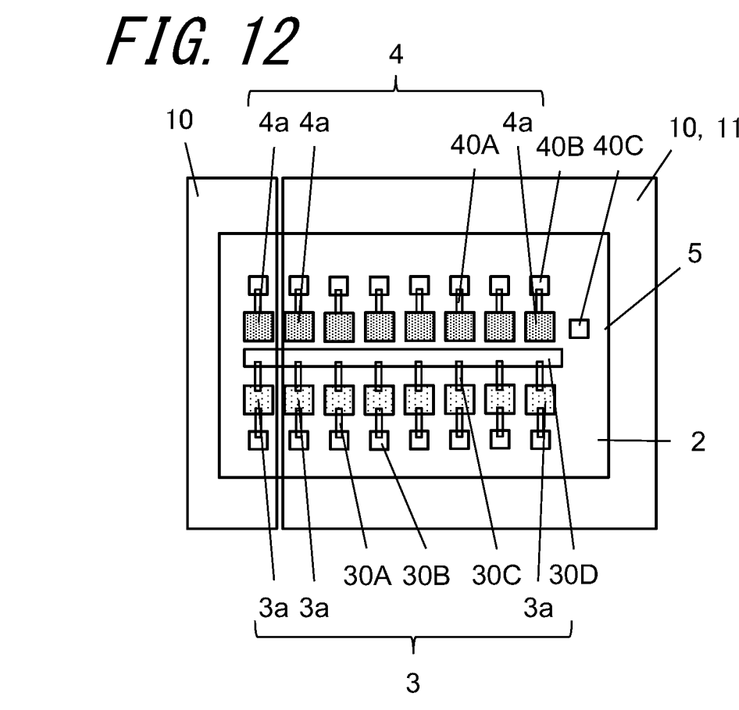
FIG. 12 is a plan view similar to FIG. 7 illustrating another example of the embodiment regarding an arrangement of a reflective member with respect to the optical sensor in the fluid detection sensor of the disclosure.

In the case where the fluid detection sensor 1 of the disclosure uses the optical sensor 5 including a plurality of pairs of the light emitting elements 3a and the light receiving elements 4a, some of the pairs can also be used to align the optical sensor 5 with the flow path member 9. An example of such a configuration is illustrated in FIG. 12. FIG. 12 illustrates another example of an embodiment of the arrangement of the reflecting member with respect to the optical sensor in the fluid detection sensor of the disclosure. FIG. 12 is a transparent plan view similar to that of FIG. 7 in which the reflecting members 10 are arranged so as to face each other with the flow path member (not illustrated) interposed therebetween. In FIG. 12, the reflecting member 10 shows a combination of a short reflecting member 10 facing a pair located at a left end in the drawing of the pairs of light emitting elements 3a and light receiving elements 4a and a long reflecting member 10 located on the right side of the short reflecting member 10 and facing the other pair. Here, the short reflecting member 10 located on the left side is a mirror member and the long reflecting member 10 located on the right side is assumed to include a retroreflective prism sheet 11 (signed but not illustrated). By arranging the optical sensor 5 and the reflecting member 10 in this way, the reflecting member 10 facing the pair of the light emitting element 3a and the light receiving element 4a located at the left end in the drawing is used as a mirror member, and thus the combination is sensitive to optical arrangement. Therefore, the optical sensor 5, the flow path member, and the reflecting member 10 can be placed accurately when aligning in an initial state. In addition, since the prism sheet 11 is placed on the reflecting member 10 facing the pair of the other light emitting elements 3a and light receiving elements 4a and retroreflection is performed, it is possible to optically detect the movement speed, magnitude, and changes in the slug flow due to a plurality of fluids in the flow path member, with favorable sensing performance. In the optical detection of these fluids, the pair of light emitting element 3a and light receiving element 4a on the left end is not used.

The fluid detection device of the disclosure includes the fluid detection sensor 1 of the disclosure and a processing unit 14 which controls the light emission of the plurality of light emitting elements 3a in the light emitting element array 3, detects the changes in output current in the plurality of light receiving element 4a of the light receiving element array 4 in response to the changes in light which occur in accordance with the movement of the plurality of fluids 7 (7a, 7b), and acquires information on the slug flow from the detected change in the output current.

In this processing unit 14, a control unit which controls light emission in the light emitting element 3a causes each light emitting element 3a to emit light at a predetermined time and a predetermined amount of light. In addition, due to changes in light which occur in accordance with the movement of the plurality of fluids 7 (7a, 7b) which form a slug flow, the detection unit detects the photocurrent corresponding to the amount of light received by the light receiving element 4a as the output current from each light receiving element 4a.

The output current detected by the detection unit includes, in a time division manner, output currents each of which is detected by each of the paired light receiving elements 4a according to the light emission of each light emitting element 3a, such as the output current that is outputted by a first light receiving element 4a, which forms a pair when a first light emitting element 3a emits light, by receiving the light and the output current that is outputted by a second light receiving element 4a, which forms a pair when a second light emitting element 3a emits light, by receiving the light. The detection unit may include an analog switch or a current amplification amplifier.

The output current detected by the detection unit is sent to a determination unit. The determination unit includes, for example, a data conversion unit, a data storage unit, a standard data storage unit, and a comparison unit. The data conversion unit converts the output current from the detection unit into a voltage value and converts an analog signal into a digital signal. In this process, an amplifier or the like may be added to amplify the signal, or a filter may be used to remove noise. The data storage unit stores the signal processed by the data conversion unit. The comparison unit compares the data stored in the data conversion unit with the data stored in the standard data storage unit. The standard data storage unit stores the distribution of signals corresponding to the output current according to the changes in light which occur in accordance with the movement of the fluid 7 (7a, 7b). As a result, by comparing the data stored in the data storage unit, which is the measured data, with the data stored in the standard data storage unit, it is possible to determine the changes in light which occurs in accordance with the movement of the fluid 7 (7a, 7b).

Further, there may be provided an analysis unit which continuously analyzes the temporal change of the signal converted by the data conversion unit in the determination unit.

Here, it is assumed that a gap (gap between the fluid 7a (7b) and the next fluid 7a (7b)) between slugs is set as L (mm), a gap between the light receiving elements 4a in two or more pairs of light emitting elements 3a and light receiving elements 4a arranged parallel to the flow path 8 through which the slug flow flows is set as D (mm), and a velocity (velocity of movement of the fluid 7a (7b)) of the slug flow is set as v (ram/sec). In addition, it is assumed that a difference between the signal fluctuation occurrence times when signal fluctuations occur in the output currents of two adjacent light receiving elements 4a and 4a, respectively, and the passage of the slug interface (meniscus: interface between the fluid 7a and the fluid 7b) is detected is set as S (sec). In this case, in the case of L≥D, the velocity v of the slug flow is calculated by v=D/S.

When L<D, a waveform of the signal fluctuation in the output current outputted by receiving light with one light receiving element 4a is recorded, and the waveform is compared between the adjacent light receiving elements 4a and 4a. Since the waveform generated by the slug interface is not homogeneous, the light receiving element 4a detects the waveform generated by the slug interface as a characteristic waveform and stores it in the data storage unit via an amplification amplifier as necessary. By comparing a plurality of waveforms stored in the data storage unit in this way, it is possible to determine whether the slug flow (fluid 7a or fluid 7b) to be detected has passed the position corresponding to the predetermined light receiving element 4a, and further, it is possible to detect a time T (sec) until the slug flow passes a position corresponding to the next light receiving element 4a. Using this time T, the velocity v of the slug flow is calculated by v=D/T.

The detection, determination, and analysis as described above can be appropriately carried out by the detection unit and the determination unit in the processing unit 14, and if necessary, by the analysis unit.

Although examples of specific embodiments of the disclosure are shown above, the disclosure is not limited to the above examples and various changes can be made without departing from the gist of the disclosure.

REFERENCE SIGNS LIST

1: Fluid detection sensor
2: Substrate
3: Light emitting element array

3a: Light emitting element
4: Light receiving element array
4a: Light receiving element
5: Optical sensor
6: Tubular body
7, 7a, 7b: Fluid
8: Flow path
9: Flow path member
10: Reflecting member
11: Prism sheet
12: Polarizing filter
13: Lens
14: Processing Unit

The invention claimed is:

1. A fluid detection sensor, comprising:
an optical sensor comprising a light emitting element array comprising a plurality of light emitting elements and a light receiving element array comprising a plurality of light receiving elements, the light emitting element array and the light receiving element array being arranged on a substrate along a longitudinal direction of the substrate;
a flow path member comprising a tubular body which is transparent and is arranged along the longitudinal direction facing the optical sensor, an inside of the tubular body constituting a flow path through which a plurality of fluids which are immiscible flow as a slug flow; and
a reflecting member placed on a side opposite to the optical sensor with respect to the flow path,
wherein the fluid detection sensor detects changes in light which occur in accordance with a movement of the plurality of fluids by the light receiving element array receiving light which is emitted by the light emitting element array toward the slug flow in the flow path and is reflected by the reflecting member.

2. The fluid detection sensor according to claim 1, wherein
the tubular body of the flow path member has a refractive index different from a refractive index of at least one of the plurality of fluids.

3. The fluid detection sensor according to claim 1, wherein
the flow path member is arranged so that a center position of the flow path is offset from a center of arrangement of the light emitting element array and the light receiving element array on a light receiving element array side.

4. The fluid detection sensor according to claim 1, wherein
the flow path member is arranged so that a center position of the flow path is offset from a center of arrangement of the light emitting element array and the light receiving element array on a light emitting element array side.

5. The fluid detection sensor according to claim 1, wherein
the reflecting member is arranged on an outer surface or an inner surface of the tubular body of the flow path member.

6. The fluid detection sensor according to claim 1, wherein
the reflecting member comprises a retroreflective reflecting surface.

7. The fluid detection sensor according to claim 1, wherein
the plurality of light emitting elements include light emitting diodes.

8. The fluid detection sensor according to claim 1, further comprising
a polarizing filter arranged between the light emitting element array and the light receiving element array, and the flow path member.

9. The fluid detection sensor according to claim 1, further comprising
a lens arranged between the light emitting element array and the light receiving element array, and the flow path member.

10. The fluid detection sensor according to claim 1, wherein
the plurality of light emitting elements of the light emitting element array and the plurality of light receiving elements of the light receiving element array form a plurality of pairs.

11. The fluid detection sensor according to claim 10, wherein
a number of the plurality of light emitting elements of the light emitting element array is three or more, and a number of the plurality of light receiving elements of the light receiving element array is three or more.

12. A fluid detection device, comprising:
the fluid detection sensor according to claim 1; and
a processing unit configured to
control light emission in the plurality of light emitting elements in the light emitting element array,
detect changes in output current in the plurality of light receiving elements in the light receiving element array in response to changes in light which occur in accordance with a movement of the plurality of fluids, and
acquire information on the slug flow from detected changes in output current.

* * * * *